(12) United States Patent
Xiang et al.

(10) Patent No.: US 10,530,286 B2
(45) Date of Patent: Jan. 7, 2020

(54) INTEGRATED ELECTRICAL PUMP AND OIL PRESSURE CONTROL METHOD THEREOF

(71) Applicant: Johnson Electric S.A., Murten (CH)

(72) Inventors: Youqing Xiang, Shenzhen (CN); Xiaoyuan Hong, Shenzhen (CN); Huabo Li, Shenzhen (CN); Qingliang Lang, Shenzhen (CN); Xiaojun Yan, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 15/873,683

(22) Filed: Jan. 17, 2018

(65) Prior Publication Data

US 2018/0205339 A1 Jul. 19, 2018

(30) Foreign Application Priority Data

Jan. 19, 2017 (CN) .......................... 2017 1 0039729

(51) Int. Cl.
| | | |
|---|---|---|
| H02P 23/00 | (2016.01) | |
| F01M 1/02 | (2006.01) | |
| F01M 1/16 | (2006.01) | |
| H02P 23/14 | (2006.01) | |
| H02P 21/06 | (2016.01) | |
| H02P 21/20 | (2016.01) | |

(52) U.S. Cl.
CPC ........... *H02P 23/0077* (2013.01); *F01M 1/02* (2013.01); *F01M 1/16* (2013.01); *H02P 21/06* (2013.01); *H02P 21/20* (2016.02); *H02P 23/0004* (2013.01); *H02P 23/14* (2013.01); *F01M 2001/0253* (2013.01); *F01M 2250/60* (2013.01); *F01M 2250/64* (2013.01)

(58) Field of Classification Search
CPC ....... F01M 1/02; H02P 23/0077; H02P 21/06; B60W 10/30; B60W 20/00
See application file for complete search history.

(56) References Cited

U.S. PATENT DOCUMENTS

| | | | | |
|---|---|---|---|---|
| 8,763,736 | B2 * | 7/2014 | Mochiyama | ........ F16H 61/0031 180/338 |
| 9,222,575 | B2 * | 12/2015 | Xie | ..................... F16H 61/0025 |
| 2005/0029023 | A1 * | 2/2005 | Takami | ................. B60W 20/30 180/65.235 |
| 2010/0021313 | A1 * | 1/2010 | Devan | ..................... F04B 49/20 417/44.1 |
| 2011/0112724 | A1 * | 5/2011 | Kariatsumari | ......... B62D 5/046 701/41 |

(Continued)

FOREIGN PATENT DOCUMENTS

| | | | | |
|---|---|---|---|---|
| JP | 2009185915 A | * | 8/2009 | |
| JP | 2016208772 A | * | 12/2016 | ............. H02P 21/04 |

*Primary Examiner* — Eduardo Colon Santana
*Assistant Examiner* — Said Bouziane
(74) *Attorney, Agent, or Firm* — Muncy, Geissler, Olds & Lowe, P.C.

(57) ABSTRACT

An integrated electrical pump comprises a motor, an oil pump driven by the motor, and a pressure control system. The pressure control system controls a hydraulic pressure of the oil pump according to a motor speed of the motor, an oil temperature and a pressure command. An oil pressure control method of the integrated electrical pump is also provided.

17 Claims, 11 Drawing Sheets

(56) References Cited

U.S. PATENT DOCUMENTS

| | | | | |
|---|---|---|---|---|
| 2011/0118940 | A1* | 5/2011 | Kariatsumari | H02P 21/04 |
| | | | | 701/42 |
| 2015/0214867 | A1* | 7/2015 | Takahashi | H02P 21/06 |
| | | | | 318/400.02 |
| 2016/0246666 | A1* | 8/2016 | Gubba Ravikumar | ...................... |
| | | | | G05F 1/625 |
| 2016/0327007 | A1* | 11/2016 | Averbukh | F02N 11/0866 |

* cited by examiner

INTEGRATED ELECTRICAL PUMP AND OIL PRESSURE CONTROL METHOD THEREOF

CROSS REFERENCE TO RELATED APPLICATIONS

This non-provisional patent application claims priority under 35 U.S.C. § 119(a) from Patent Application No. 201710039729.3 filed in the People's Republic of China on Jan. 19, 2017.

TECHNICAL FIELD

The present disclosure relates to an automatic transmission in a hybrid electric vehicle, in particular to an integrated electrical pump (IEP) and an oil pressure control method thereof.

BACKGROUND

In a hybrid electric vehicle, an Integrated Electrical Pump (IEP) is used to provide engine oil to a gearbox after the main pump is turned off in an internal combustion engine or gearbox. Since the integrated electric pump can provide engine oil with a certain hydraulic pressure for a longer period of time to the gearbox, it has more advantages than traditional accumulators.

In order to maintain the hydraulic pressure of the integrated electrical pump, a pressure sensor is needed in the integrated electric pump. However, the pressure sensor takes up a space and increases a cost.

SUMMARY

An integrated electrical pump comprises a motor, an oil pump driven by the motor, and a pressure control system. The pressure control system controls a hydraulic pressure of the oil pump according to a motor speed of the motor, an oil temperature and a pressure command.

Preferably, a position signal which represents a position of a rotor of the motor is outputted to the pressure control system.

Preferably, the pressure control system comprises an oil temperature receiving module to receive a temperature detection signal which represents a temperature $T_0$ of the oil pump.

Preferably, the pressure control system comprises a pressure control module to output the pressure command according to a working condition of the integrated electrical pump.

Preferably, the pressure control system comprises a position and speed calculation module to receive the position signal and calculate a motor speed; a pressure compensation module to obtain an estimated mechanical torque of the motor according to the pressure command, the temperature, and the motor speed.

Preferably, the pressure control system comprises a torque compensation module to obtain an estimated electromagnetic torque according to the estimated mechanical torque and the motor speed.

Preferably, the integrated electrical pump further comprises a drive circuit to drive the motor, wherein the pressure control system comprises a control module to control a switch state of a plurality of switches of the drive circuit according to the estimated electromagnetic torque.

Preferably, the integrated electrical pump further comprises a current detector to output a current detection signal to the pressure control system, wherein the pressure control system comprises a Clark/Park transformation module to perform a Clark and Park transformation on the current detection signal to obtain a D axis current and a Q axis current.

Preferably, the pressure control system comprises a torque transformation module to obtain an estimated D axis current and an estimated Q axis current according to the estimated electromagnetic torque.

Preferably, the pressure control system comprises a position and speed calculation module to receive the position signal and calculate a motor speed; a pressure compensation module to obtain an estimated mechanical torque of the motor according to the pressure command, the temperature, and the motor speed.

Preferably, the pressure control system comprises a torque compensation module to obtain an estimated electromagnetic torque according to the estimated mechanical torque and the motor speed.

Preferably, the pressure compensation module comprises a PI controller and a pressure estimation sub-module to form a close loop control to output the estimated mechanical torque.

Preferably, an estimated pressure is obtained by the pressure estimation sub-module according to a formula as below: $p'=f(T_m, n, T_0)=b \times T_m - a \times b \times n + c$, where $p'$ is the estimated pressure, $T_m$ is an actual mechanical torque, the parameters a, b, and c are related to the oil temperature.

Preferably, the integrated electrical pump further comprises an electrical control unit, wherein the pressure control system is stored in the electrical control unit and performed by the electrical unit.

An oil pressure control method of an integrated electrical pump having a motor, comprising:

outputting a pressure command p* according to a working condition of a vehicle;

obtaining a position angle of a rotor of the motor and calculating a motor speed according to a relation between the position angle and time;

obtaining an estimated mechanical torque according to the pressure command, a temperature, and the motor speed;

obtaining an estimated electromagnetic torque according to the estimated mechanical torque and the motor speed; and outputting a PWM signal to control the motor speed.

Preferably, obtaining the estimated mechanical torque comprises: obtaining a filtered mechanical torque by filtering the estimated mechanical torque and outputting an estimated pressure according to the motor speed, the temperature, and the filtered mechanical torque; and outputting the estimated mechanical torque according to the pressure command and the estimated pressure.

Preferably, outputting the PWM signal to control the motor speed comprises:

obtaining a phase current of the motor and performing a Clark transformation and a Park transformation on the three phase current to obtain a D axis current and a Q axis current;

obtaining an estimated D axis current and an estimated Q axis current according to the estimated electromagnetic torque;

obtaining a D axis voltage and a Q axis voltage via performing a PI control on a difference between the estimated D axis current and the D axis current, a difference between the estimated Q axis current and the Q axis current; and generating the PWM signal according to the D axis voltage, the Q axis voltage.

Preferably, wherein obtaining the estimated mechanical torque comprises:

obtaining an actual electromagnetic torque;

performing a PI control or a PID control on a difference between the actual electromagnetic torque and the estimated electromagnetic torque to control a switch state of the plurality of switches of the drive circuit.

Figure 1:
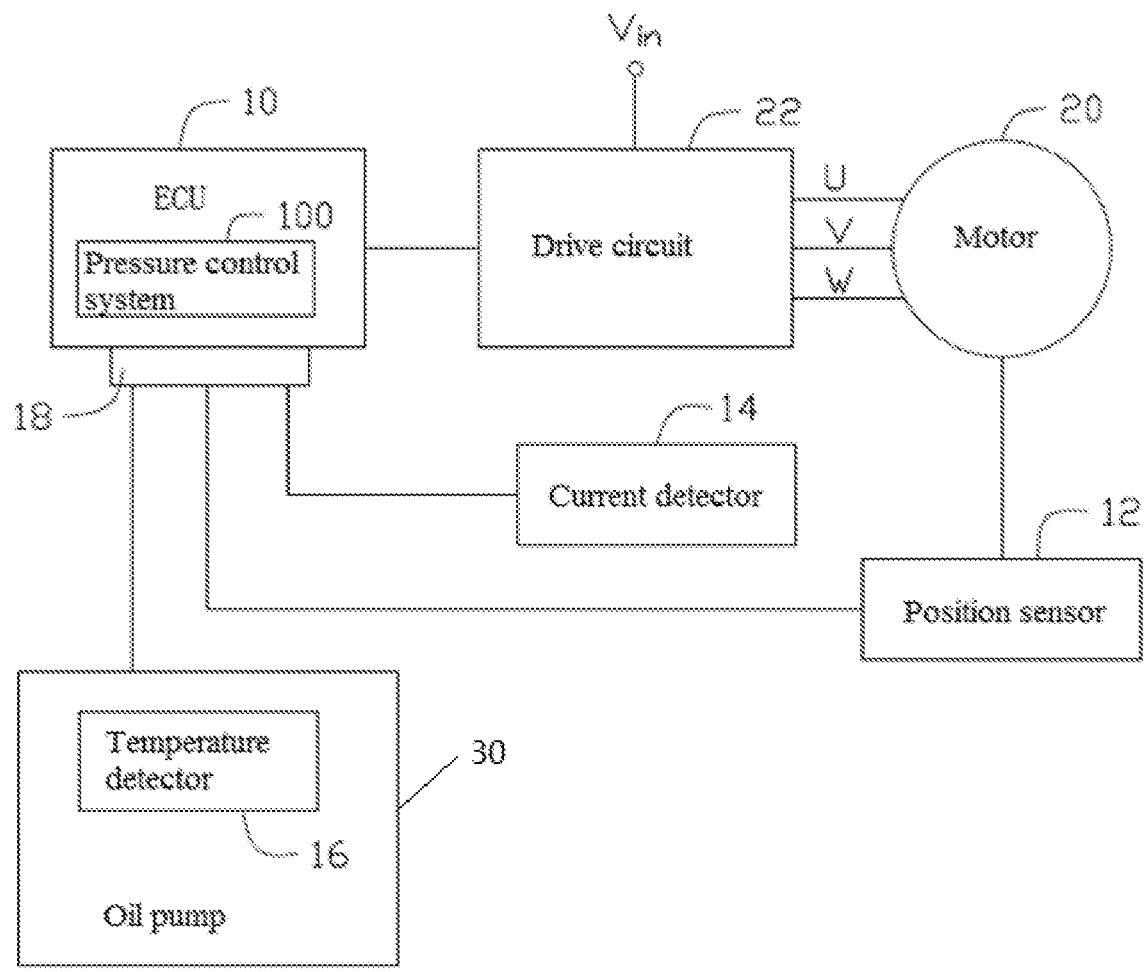
FIG. 1 shows an integrated electrical pump having a pressure control system according to one embodiment.

The following implementations are used for the description of the present disclosure in conjunction with above figures.

DETAILED DESCRIPTION OF THE EMBODIMENTS

Hereinafter technical solutions in embodiments of the present disclosure are described clearly and completely in conjunction with the drawings in embodiments of the present disclosure. Apparently, the described embodiments are only some rather than all of the embodiments of the present disclosure. Any other embodiments obtained based on the embodiments of the present disclosure by those skilled in the art without any creative work fall within the scope of protection of the present disclosure. It is understood that, the drawings are only intended to provide reference and illustration, and not to limit the present disclosure. The connections in the drawings are only intended for the clearance of description, and not to limit the type of connections.

It should be noted that, if a component is described to be "connected" to another component, it may be connected to another component directly, or there may be an intervening component simultaneously. All the technical and scientific terms in the present disclosure have the same definitions as the general understanding of those skilled in the art, unless otherwise defined. Herein the terms in the present disclosure are only intended to describe embodiments, and not to limit the present disclosure.

FIG. 1 an integrated electrical pump having a pressure control system according to one embodiment. The pressure control system 100 can be used in a hybrid vehicle which comprises an integrated electrical pump (IEP) 30. The integrated electrical pump 30 can include an oil pump which is driven by a motor 20. The pressure control system 100 can control a hydraulic pressure of oil pump by controlling a motor speed of the motor 20 in the integrated electrical pump.

The integrated electrical pump 30 can include an electrical control unit (ECU) 10, a position sensor 12, a current detector 14, an oil temperature detector 16. The pressure control system 100 can be stored in a memory of the electrical control unit 10 and performed by the electrical control unit 10. The position sensor 12 can sense a position of a rotor of the motor 20 and output a position signal. The current detector 14 can detect a phase current of the motor 20 and outputs a current detection signal. The oil temperature detector 16 is configured to detect an oil temperature in the integrated electrical pump 30 and output a temperature detection signal which represents oil temperature $T_O$. The electrical control unit 10 can include a plurality of input and output interfaces 18 to connect the position sensor 12, the current detector 14, and the oil temperature detector 16.

In the embodiment, the motor 20 can be a three phase motor. The integrated electrical pump 30 can further include a drive circuit 22 to drive the motor 20. In the embodiment, the current detector 14 can detect three phase current of the drive circuit.

The pressure control system 100 can control a hydraulic pressure of oil according to the position signal, the current detection signal and the temperature detection signal.

Figure 2:
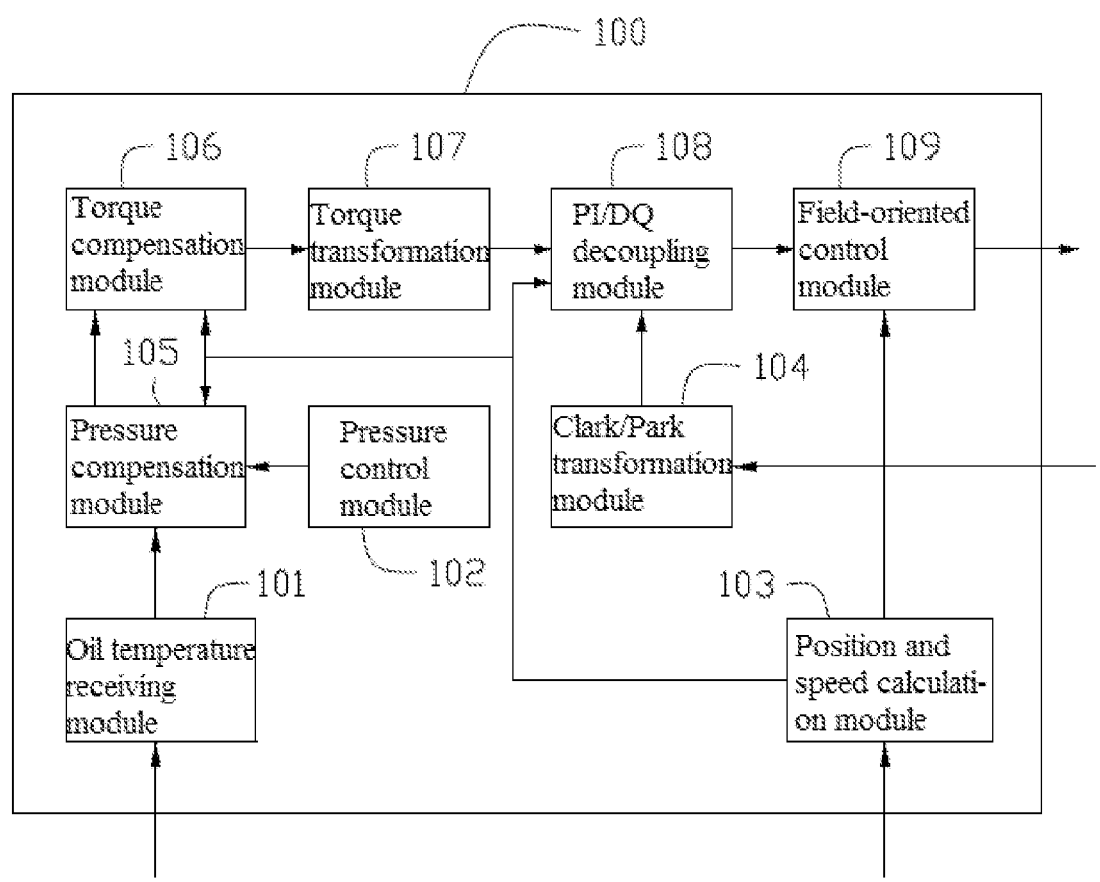
FIG. 2 shows a block diagram of the pressure control system of FIG. 1.

FIG. 2 shows the pressure control system 100 can include an oil temperature receiving module 101, a pressure control module 102, a position and speed calculation module 103, a Clark/Park transformation module 104, a pressure compensation module 105, a torque compensation module 106, a torque transformation module 107, a PI/DQ decoupling module 108, and a field-oriented control module 109.

In the embodiment, the oil temperature receiving module 101 can receive the temperature detection signal output by the oil temperature detector 16 via one of plurality of input and output interfaces 15. The position and speed calculation module 103 can receive the position signal output by the position sensor 12 via one of plurality of input and output interfaces 15. The Clark/Park transformation module 104 can receive the current detection signal output by the current detector 14 via one of plurality of input and output interfaces 15.

The oil temperature receiving module 101 transfers the temperature detection signal to the pressure compensation module 105. The position and speed calculation module 103 obtains the position signal which is a sine signal or a cosine signal. The position and speed calculation module 103 obtains a position angle θ of the rotor and calculates a motor speed according to a relation between the position angle θ and time. In the embodiment, the position angle θ can be a mechanical angle $\theta_r$ of the rotor or an electrical angle $\theta_e$ of the rotor. The motor speed can be an angular velocity ω or a rotation speed n. In another embodiment, the position and speed calculation module 103 can obtains the angular velocity ω or a rotation speed n simultaneously. In the embodiment, the angular velocity ω is obtained by the position and speed calculation module 103. The angular velocity ω can be a mechanical angular velocity $\omega_r$ or an electrical angular velocity $\omega_e$. The Clark/Park transformation module 104 performs a Clark transformation and a Park transformation on the current detection signal to obtain a D axis current $i_d$ and a Q axis current $i_q$.

The pressure control module 102 outputs a pressure command p* according to a working condition of the vehicle. In the embodiment, the pressure command p* can include a target hydraulic pressure of the integrated electrical pump. The pressure compensation module 105 can obtains an estimated mechanical torque $T_m$* of the motor according to the pressure command p*, the temperature $T_O$, and the angular velocity ω. The torque compensation module 106 can obtains an estimated electromagnetic torque $T_e$* according to the estimated mechanical torque $T_m$* and the angular velocity ω. The torque transformation module 107 can obtains an estimated D axis current $i_d^*$ and an estimated Q axis current $i_q^*$ according to the estimated electromagnetic torque $T_e^*$.

The PI/DQ decoupling module 108 receives the estimated D axis current $i_d^*$, the estimated Q axis current $i_q^*$, the D axis current $i_d$, the Q axis current $i_q$, and the angular velocity ω. The PI/DQ decoupling module 108 performs a PI control on a difference between the estimated D axis current $i_d^*$ and the D axis current $i_d$, a difference between the estimated Q axis current $i_q^*$ and the Q axis current $i_q$ according to the angular velocity ω. A D axis voltage and a Q axis voltage are obtained by decoupling the difference between the estimated D axis current $i_d^*$ and the D axis current $i_d$, a difference between the estimated Q axis current $i_q^*$ and the Q axis current $i_q$ after PI control. The filed-oriented control module 109 outputs a PWM signal to the drive circuit 22 according to the D axis voltage, the Q axis voltage, and the position angle θ. In the embodiment, the drive circuit 22 can be a three phase inverter.

Figure 3:
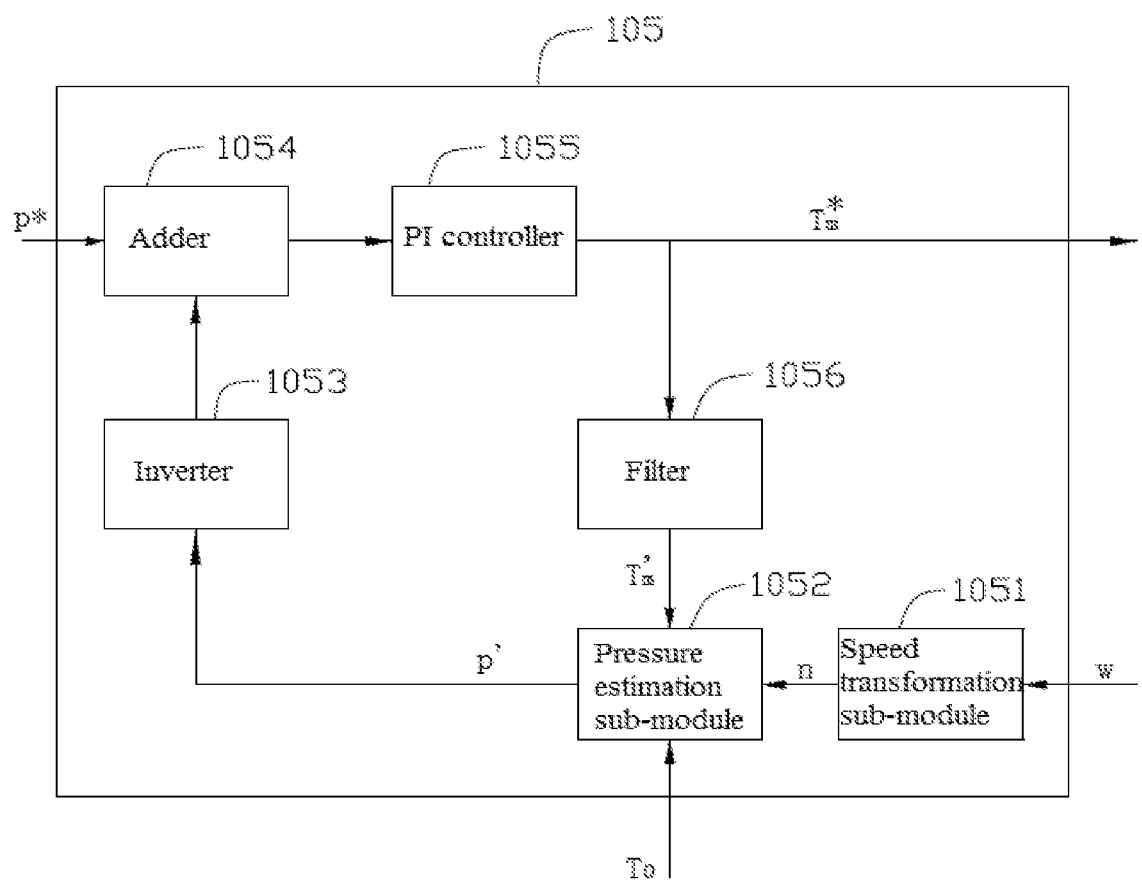
FIG. 3 shows a block diagram of a pressure compensation module of the pressure control system of FIG. 2.

FIG. 3 shows a block diagram of the pressure compensation module 105 of FIG. 2. The pressure compensation module 105 can include a speed transformation sub-module 1051, a pressure estimation sub-module 1052, an inverter 1053, an adder 1054, a PI controller 1055, and a filter 1056. The pressure estimation sub-module 1052, the inverter 1053, the adder 1054, the PI controller 1055 and the filter 1056 form a close loop control.

The speed transformation sub-module 1051 transfers the angular velocity ω to the rotation speed n. In another embodiment, when the position and speed calculation module 103 outputs the rotation speed n, the speed transformation sub-module 1051 can be omitted. The pressure estimation sub-module 1052 outputs an estimated pressure p' according to the rotation speed n, the temperature $T_0$, a filtered mechanical torque $T_m'$ filtered by the filter 1056 from the estimated mechanical torque $T_m^*$. The inverter 1053 inverts the estimated pressure p' and outputs the estimated pressure p' to the adder 1054. A difference between the pressure command p* and the estimated pressure p' is obtained by adding the pressure command p* and the estimated pressure p' which is inverted by the invert 1053. The PI controller 1055 performs a PI control with the difference between the pressure command p* and the estimated pressure p' and outputs the estimated mechanical torque $T_m^*$. The filtered mechanical torque $T_m'$ is obtained by filtering the estimated mechanical torque $T_m^*$ with the filter 1056. In the embodiment, the filter 1056 can be a one-order low pass filter or a two-order low pass filter.

In the embodiment, the estimated pressure p' is obtained by the pressure estimation sub-module 1052 according to a formula as below: $p'=f(T_m, n, T_0)=b \times T_m - a \times b \times n + c$, where the parameters a, b, and c are related to the temperature $T_0$. A look-up table can be stored in the electrical control unit 14. The look-up table can include the parameters a, b, and c corresponding to different temperature $T_0$. An actual rotation speed n, an actual mechanical torque $T_m$, and an output pressure p can be measured, thus a relation curve between the output pressure p and the actual rotation speed n, the actual mechanical torque $T_m$ at different temperature can be obtained as shown in FIG. 4 and FIG. 5.

Figure 4:
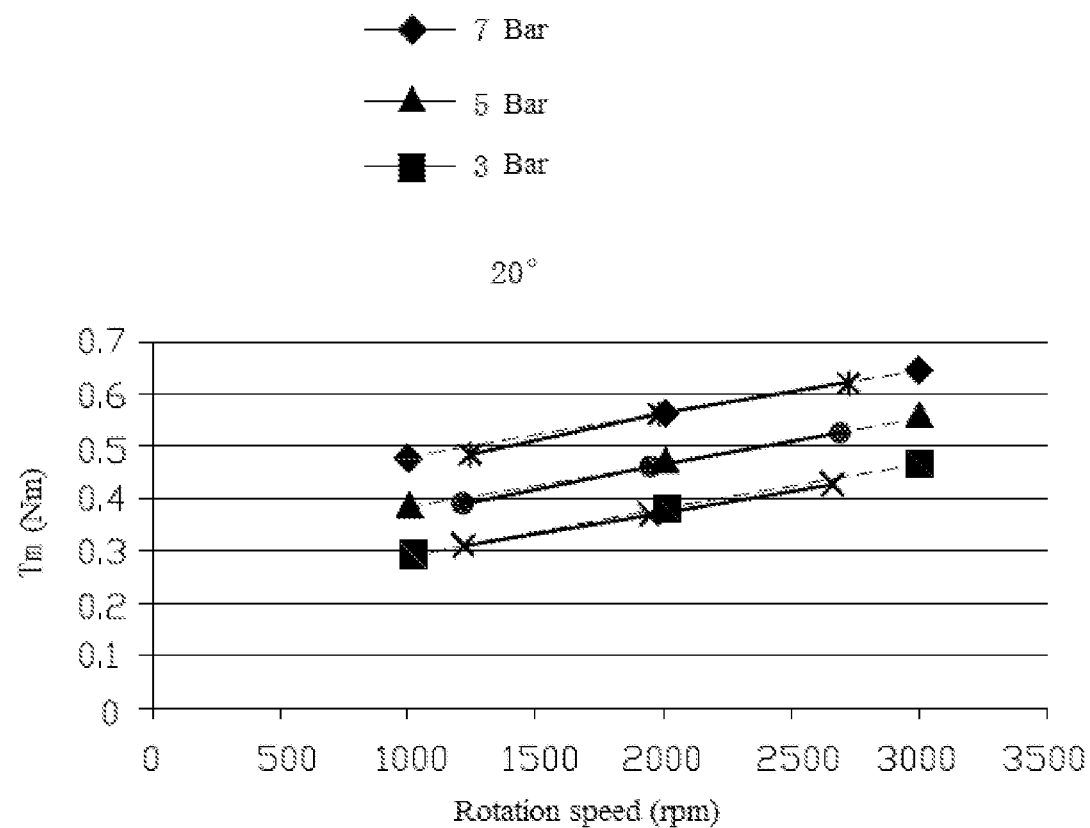
FIG. 4 and FIG. 5 show a schematic graph of characteristic curves of a hydraulic pressure, a motor speed, and a torque according to one embodiment.
Figure 5:
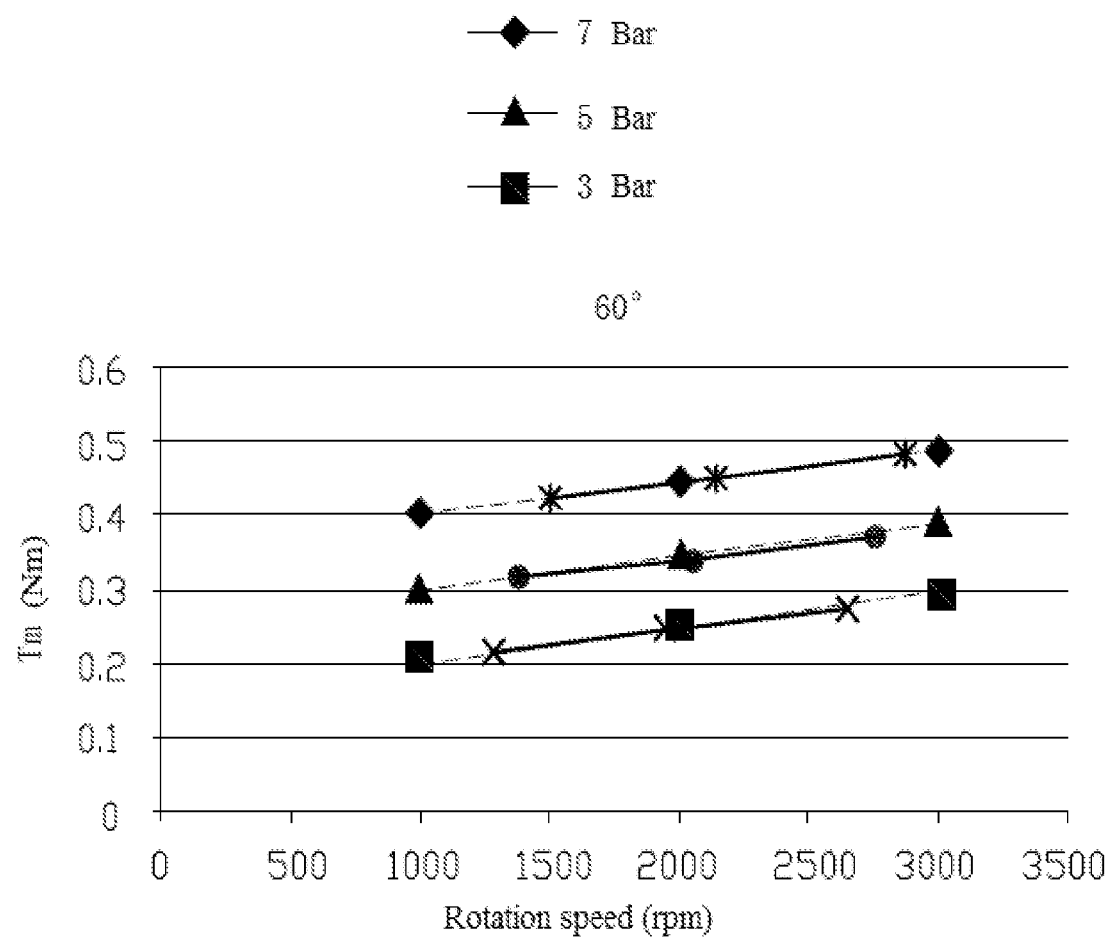

In FIG. 4 and FIG. 5, the solid line represents that a relation between the output pressure p and the actual rotation speed n, the actual mechanical torque $T_m$ at 20° C. and 60° C. The dotted lines are obtained by correcting the solid line. The parameters a, b, and c can be obtained from the dotted line at different temperatures and stored in the look-up table.

The pressure estimation sub-module 1052 can obtain the parameters a, b, and c via searching the look-up table.

The torque compensation module 106 obtains an estimated electromagnetic torque $T_e^*$ according to the estimated mechanical torque $T_m^*$ and the angular velocity ω according to a formula as below:

$$T_e^* = T_m^* + F\omega_r + T_{Fe} \qquad (1)$$

$$T_{Fe} = \frac{P_{Fe}}{\omega_r} = \frac{K_h B_{max}^2 f + K_c(B_{max}f)^2 + K_e(B_{max}f)^{1.5}}{\omega_r} \approx K_{fe}f\omega_r \qquad (2)$$

where, $K_h \gg K_c$, $K_h \gg K_e$, F is a viscous friction of the rotor, $T_{Fe}$ is a torque related to ferrite core loss, $K_h$ is a hysteresis coefficient, $K_c$ is a classical eddy coefficient, $K_e$ is an anomalous eddy current coefficient, $B_{max}$ is a maximum amplitude of the flux density, and f is a switch frequency.

A formula can be obtained by combining formula (1) and formula (2) as below $$T_e^* T_m^* + K_{T11}\omega_r + K_{T12} \qquad (3),$$

where $K_{T11}=F+K_{Fe}f$, $K_{Fe}$ is an iron loss coefficient. KT11 and KT12 can be calibrated with tests and stored in the electrical control unit.

In another embodiment, the PI/DQ decoupling module 108 can be a PID/DQ decoupling module. The PI controller 1055 can be a PID controller.

In another embodiment, the position and speed calculation module 103 can be omitted. The pressure control system 100 can directly obtain the rotation speed via the position sensor.

In another embodiment, the Clark/Park transformation module 104 can be arranged outside of the pressure control system 100.

In another embodiment, the pressure control system 100 does not include the Clark/Park transformation module 104, the pressure compensation module 105, and the PI/DQ decoupling module 108. In an alternative embodiment, the pressure control system 100 can include an actual torque obtaining module to obtain an actual electromagnetic torque $T_e$ and output the estimated electromagnetic torque $T_e^*$, a PI or PID control module to perform a PI or PID control with the estimated electromagnetic torque $T_e^*$.

Figure 6:
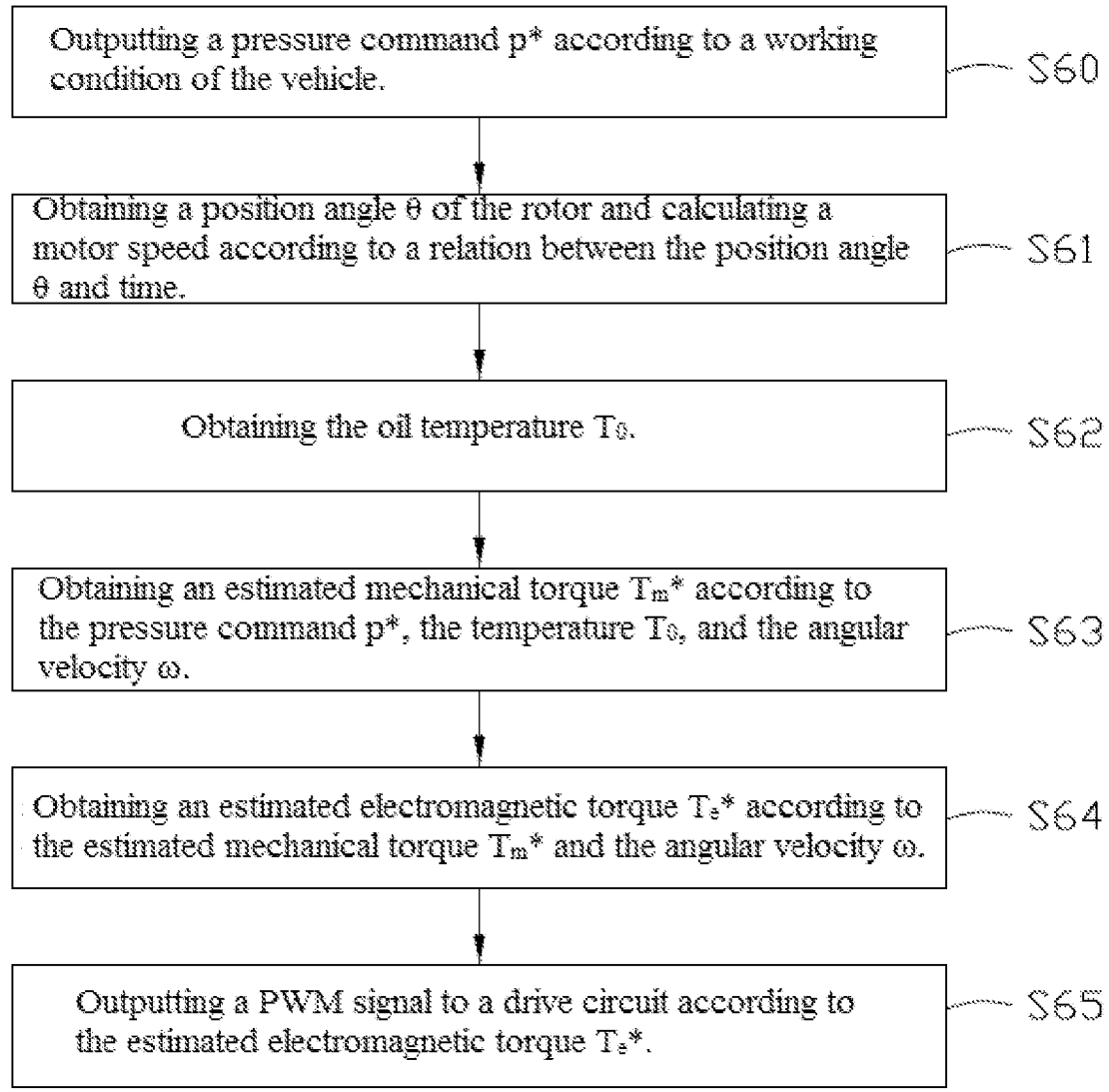
FIG. 6 shows a flowchart of an oil pressure control method according to one embodiment.

FIG. 6 shows a flowchart of an oil pressure control method according to one embodiment. The oil pressure control method is provided by way of example, as there are a variety of ways to carry out the method. The oil pressure control method described below can be carried out using the configurations illustrated in FIG. 2 for example, and various elements of these figures are referenced in explaining the oil pressure control method. Each block shown in FIG. 6 represents one or more processes, methods, or subroutines carried out in the oil pressure control method. Additionally, the illustrated order of blocks is by example only and the order of the blocks can be changed. The oil pressure control method can begin at block S60. Depending on the embodiment, additional steps can be added, others removed, and the ordering of the steps can be changed.

In S60, outputting a pressure command p* according to a working condition of the vehicle. In the embodiment, the pressure command p* can include a target hydraulic pressure of the integrated electrical pump.

In S61, obtaining a position angle θ of the rotor and calculating a motor speed according to a relation between the position angle θ and time. In the embodiment, the position angle θ can be a mechanical angle $θ_r$ of the rotor or an electrical angle $\theta_e$ of the rotor. The motor speed can be an angular velocity $\omega$ or a rotation speed n.

In S62, obtaining the oil temperature $T_0$.

In S63, obtaining an estimated mechanical torque $T_m^*$ according to the pressure command p*, the temperature $T_0$, and the angular velocity $\omega$.

In S64, obtaining an estimated electromagnetic torque $T_e^*$ according to the estimated mechanical torque $T_m^*$ and the angular velocity $\omega$.

In S65, outputting a PWM signal to a drive circuit according to the estimated electromagnetic torque $T_e^*$.

Figure 7:
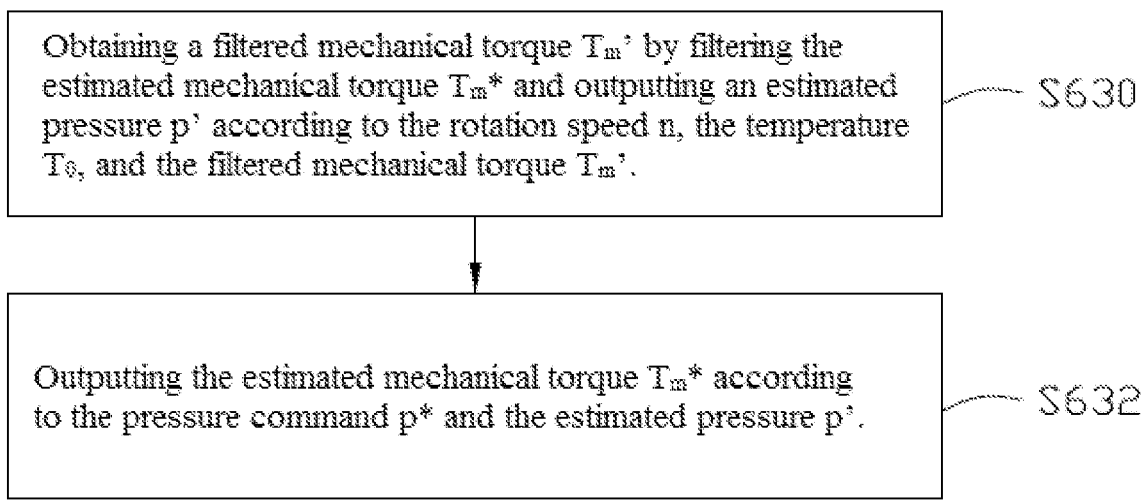
FIGS. 7-9 show a sub-flowchart of the oil pressure control method of FIG. 6.

FIG. 7 shows a sub-flowchart of obtaining the estimated mechanical torque $T_m^*$.

In S630, obtaining a filtered mechanical torque $T_m'$ by filtering the estimated mechanical torque $T_m^*$ and outputting an estimated pressure p' according to the rotation speed n, the temperature $T_0$, and the filtered mechanical torque $T_m'$.

In S632, outputting the estimated mechanical torque $T_m^*$ according to the pressure command p* and the estimated pressure p'.

Figure 8:
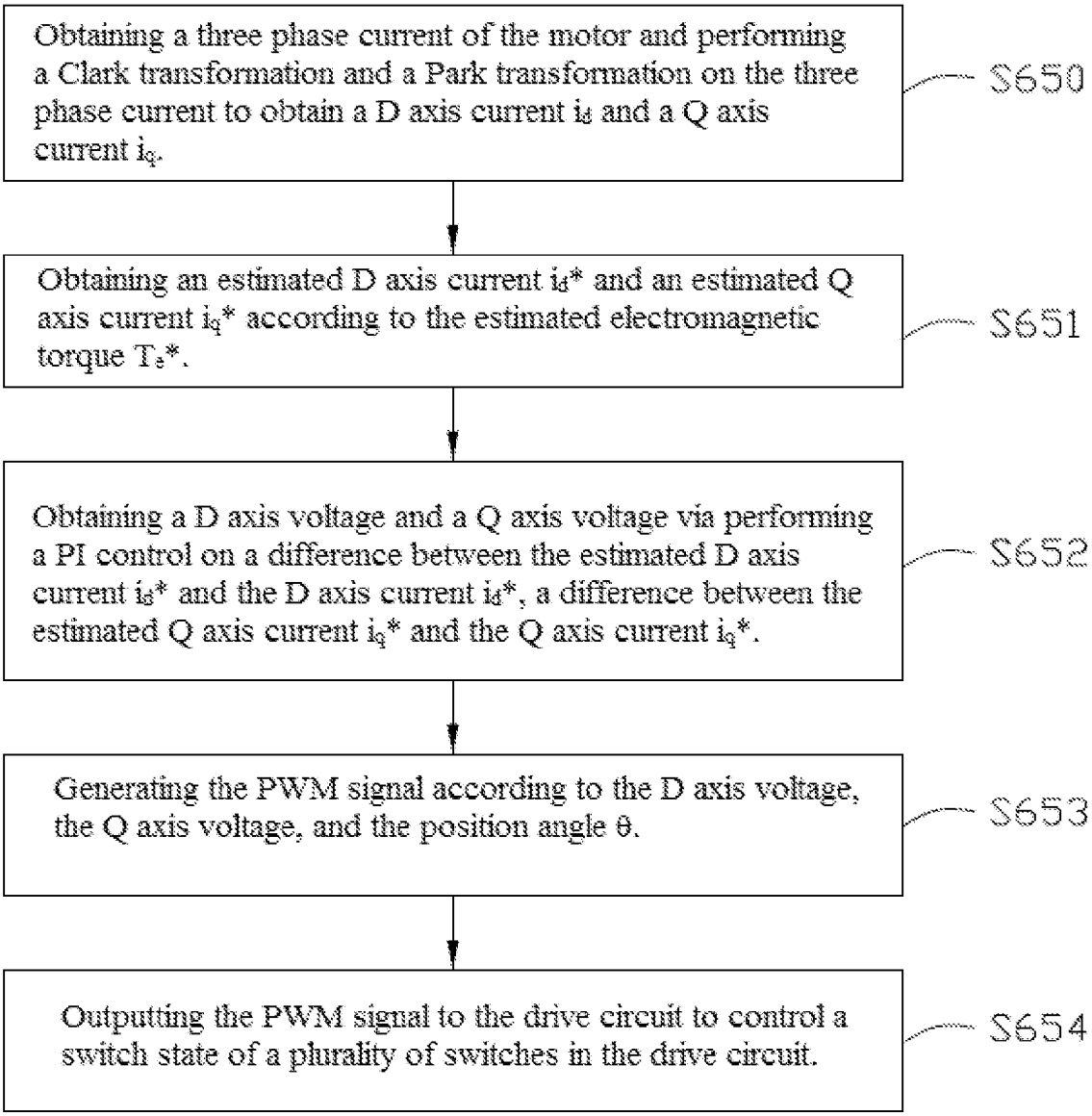

FIG. 8 shows a sub-flowchart of outputting the PWM signal to the drive circuit.

In S650, obtaining a three phase current of the motor and performing a Clark transformation and a Park transformation on the three phase current to obtain a D axis current $i_d$ and a Q axis current $i_q$.

In S651, obtaining an estimated D axis current $i_d^*$ and an estimated Q axis current $i_q^*$ according to the estimated electromagnetic torque $T_e^*$.

In S652, obtaining a D axis voltage and a Q axis voltage via performing a PI control on a difference between the estimated D axis current $i_d^*$ and the D axis current $i_d^*$, a difference between the estimated Q axis current $i_q^*$ and the Q axis current $i_q^*$.

In S653, generating the PWM signal according to the D axis voltage, the Q axis voltage, and the position angle $\theta$.

In S654, outputting the PWM signal to the drive circuit to control a switch state of a plurality of switches in the drive circuit. Thus the motor speed can be controlled.

In another embodiment, a PID control can be performed on a difference between the estimated D axis current $i_d^*$ and the D axis current $i_d^*$, a difference between the estimated Q axis current $i_q^*$ and the Q axis current $i_q^*$ according to the angular velocity $\omega$. And decoupling the difference between the estimated D axis current $i_d^*$ and the D axis current $i_d^*$, a difference between the estimated Q axis current $i_q^*$ and the Q axis current $i_q^*$ after PID control to obtain a D axis decoupling value and a Q axis decoupling value.

Figure 9:
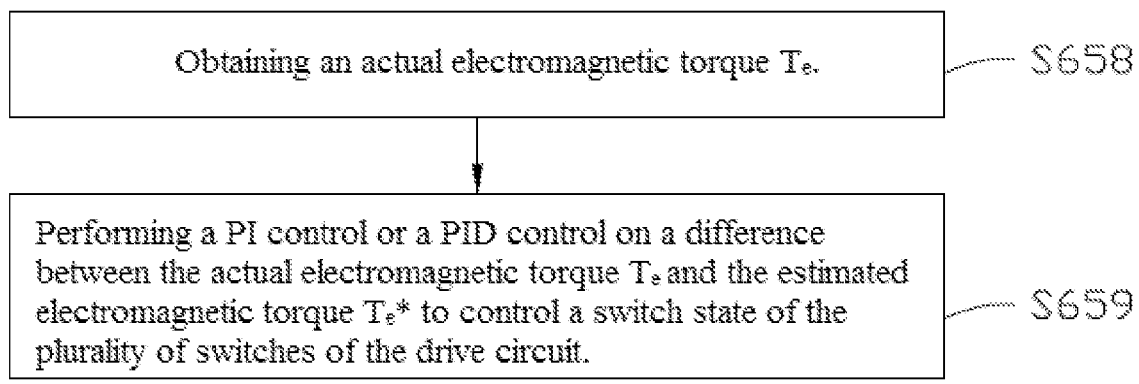

FIG. 9 shows a sub-flowchart of obtaining the estimated mechanical torque $T_m^*$.

In S658, obtaining an actual electromagnetic torque $T_e$.

In S659, performing a PI control or a PID control on a difference between the actual electromagnetic torque $T_e$ and the estimated electromagnetic torque $T_e^*$ to control a switch state of the plurality of switches of the drive circuit.

Figure 10:
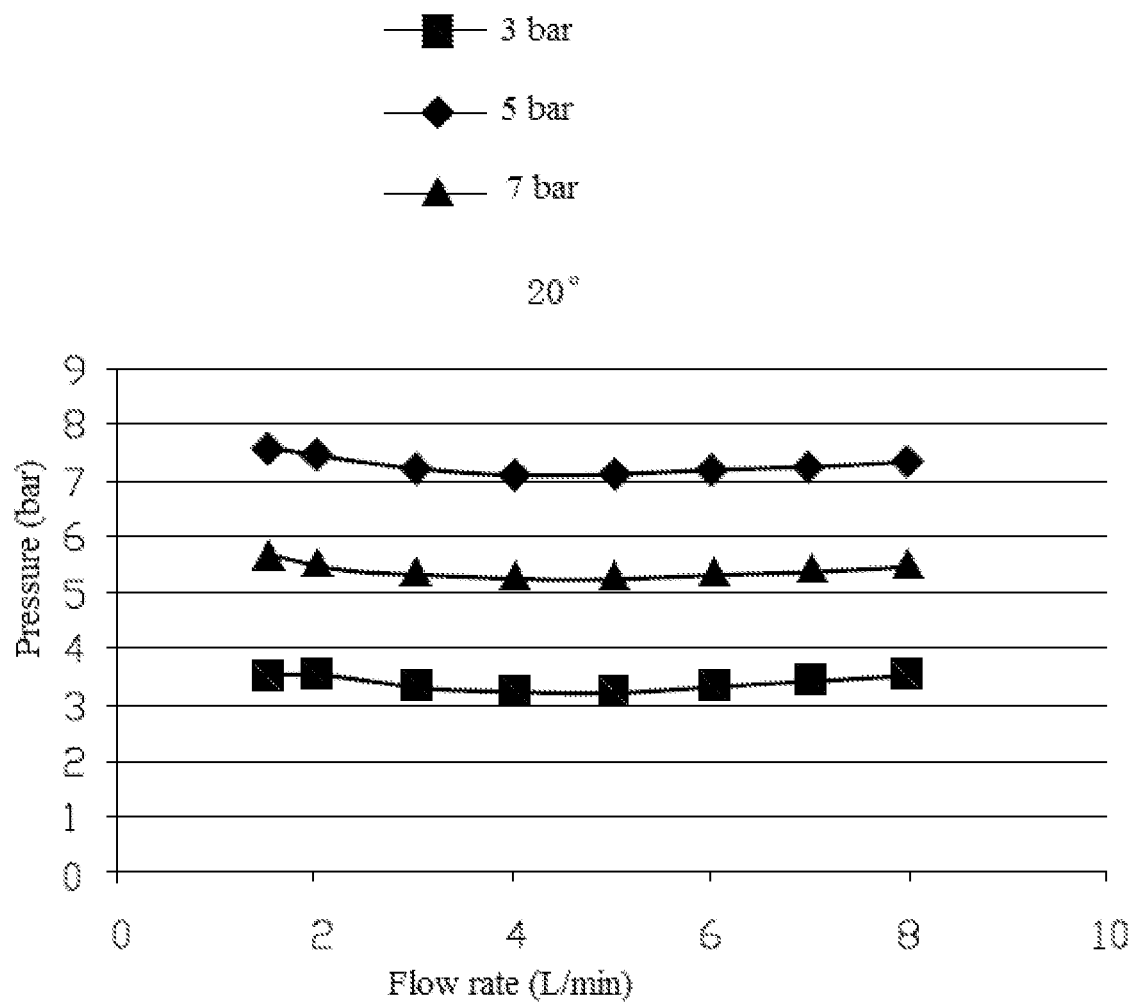
FIG. 10 shows a schematic graph of characteristic curves of a flow speed and a hydraulic pressure under 20° C.
Figure 11:
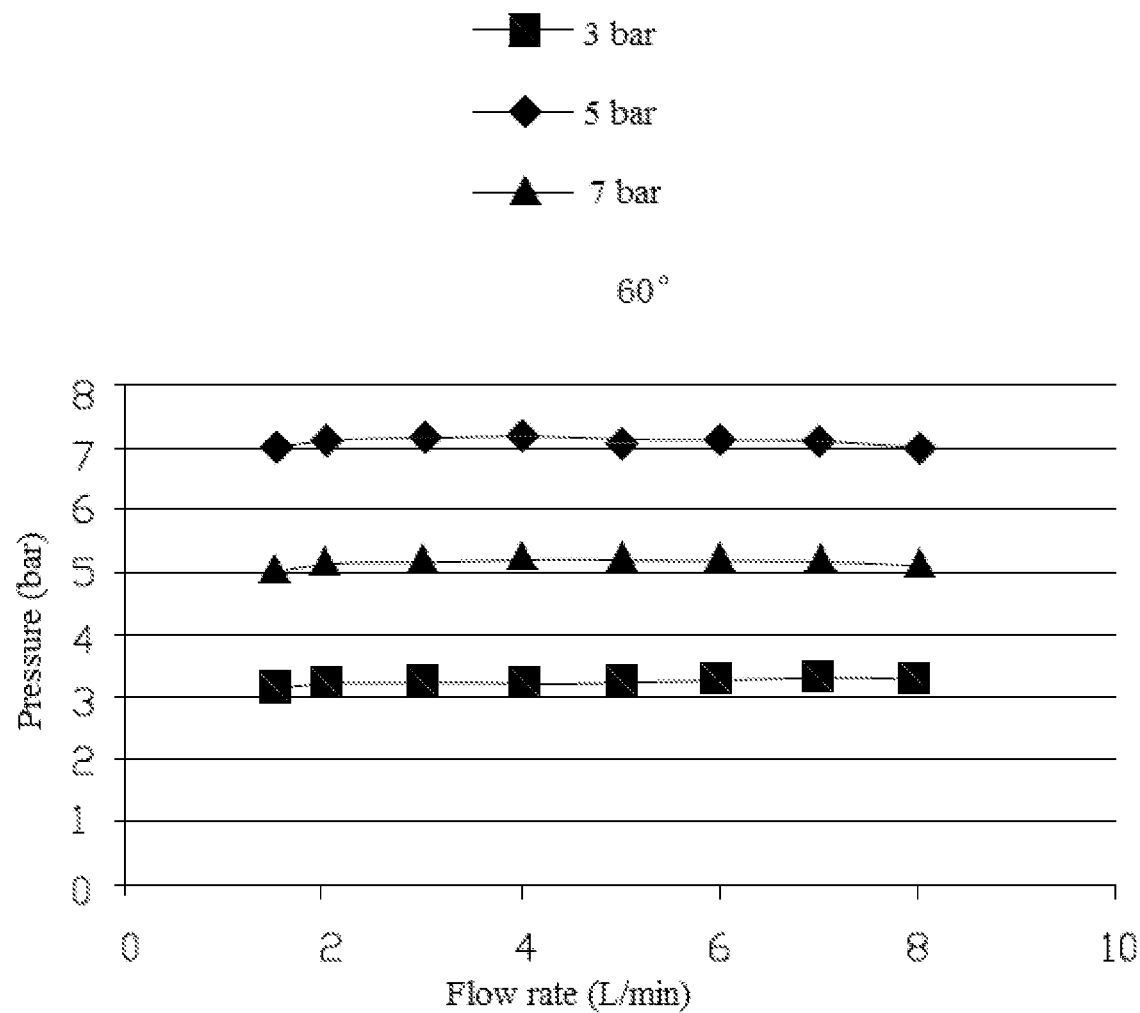
FIG. 11 shows a schematic graph of characteristic curves of a flow speed and a hydraulic pressure under 60° C.

FIGS. 10 and 11 show schematic graph of characteristic curves of a flow speed and a hydraulic pressure under 20° C. and 60° C. The test results are static performance of pressure control at different flow rate (1.5 L/min 8 L/min) and different oil temperatures (20° C. and 60° C.). The oil pressure control method can satisfy the accuracy requirements are +30% for the hydraulic pressure with 3 bar, +20% for the hydraulic pressure with 5 bar, and +20% for the hydraulic pressure with 7 bar.

In the embodiment, a response time from 3 bar to 5 bar is 46 ms under 25° C. and a response time from 5 bar to 7 bar is 44 ms under 25° C.

In summary, the pressure sensor can be omitted in the integrated electrical pump, a space can be saved and a cost can be reduced. And the oil pressure control method can improve a control accuracy and a response time.

Described above are preferable embodiments of the present disclosure, which are not intended to limit the present disclosure. All the modifications, equivalent replacements and improvements in the scope of the spirit and principles of the present disclosure are in the protection scope of the present disclosure.

The invention claimed is:

1. An integrated electrical pump, comprising:
   a motor;
   an oil pump driven by the motor; and
   a pressure control system receiving a pressure command according to a working condition of a vehicle;
   outputting an estimated pressure according to a motor speed which is obtained by a position sensor, an oil temperature which is obtained by an oil temperature detector, and a filtered mechanical torque;
   outputting an estimated mechanical torque according to the pressure command and the estimated pressure;
   obtaining an estimated electromagnetic torque according to the estimated mechanical torque and the motor speed; and
   outputting a PWM signal to control the motor speed.

2. The integrated electrical pump of claim 1, wherein a position signal which represents a position of a rotor of the motor is outputted to the pressure control system.

3. The integrated electrical pump of claim 2, wherein the pressure control system comprises an oil temperature receiving module to receive a temperature detection signal which represents the oil temperature of the oil pump.

4. The integrated electrical pump of claim 3, wherein the pressure control system comprises a pressure control module to output the pressure command according to a working condition of the integrated electrical pump.

5. The integrated electrical pump of claim 4, wherein the pressure control system comprises a position and speed calculation module to receive the position signal and calculate the motor speed; a pressure compensation module to obtain the estimated mechanical torque of the motor according to the pressure command, the oil temperature, and the motor speed.

6. The integrated electrical pump of claim 5, wherein the pressure control system comprises a torque compensation module to obtain the estimated electromagnetic torque according to the estimated mechanical torque and the motor speed.

7. The integrated electrical pump of claim 6, further comprising a drive circuit to drive the motor, wherein the pressure control system comprises a control module to control a switch state of a plurality of switches of the drive circuit according to the estimated electromagnetic torque.

8. The integrated electrical pump of claim 7, further comprising a current detector to output a current detection signal to the pressure control system, wherein the pressure control system comprises a Clark/Park transformation module to perform a Clark and Park transformation on the current detection signal to obtain a D axis current and a Q axis current.

9. The integrated electrical pump of claim 7, wherein the pressure control system comprises a torque transformation module to obtain an estimated D axis current and an estimated Q axis current according to the estimated electromagnetic torque.

10. The integrated electrical pump of claim 9, wherein the pressure control system comprises a PI/DQ decoupling module to perform a PI control on a difference between the estimated D axis current and the D axis current, a difference between the estimated Q axis current and the Q axis current according to the motor speed and a D axis voltage and a Q axis voltage are obtained.

11. The integrated electrical pump of claim 10, wherein the pressure control system comprises a field-oriented control module to output a PWM signal to the drive circuit according to the D axis voltage and the Q axis voltage.

12. The integrated electrical pump of claim 5, wherein the pressure compensation module comprises a PI controller and a pressure estimation sub-module to form a close loop control to output the estimated mechanical torque.

13. The integrated electrical pump of claim 12, wherein the estimated pressure is obtained by the pressure estimation sub-module.

14. The integrated electrical pump of claim 1, further comprising an electrical control unit, wherein the pressure control system is stored in the electrical control unit and performed by the electrical control unit.

15. An oil pressure control method of an integrated electrical pump having a motor, comprising:
   outputting a pressure command according to a working condition of a vehicle;
   obtaining a position angle of a rotor of the motor via a position sensor and calculating a motor speed according to a relation between the position angle and time;
   obtaining a filtered mechanical torque by filtering an estimated mechanical torque and outputting an estimated pressure according to the motor speed, an oil temperature which is obtained via an oil temperature detector, and the filtered mechanical torque;
   outputting the estimated mechanical torque according to the pressure command and the estimated pressure;
   obtaining an estimated electromagnetic torque according to the estimated mechanical torque and the motor speed; and
   outputting a PWM signal to control the motor speed.

16. The oil pressure control method of claim 15, wherein outputting the PWM signal to control the motor speed comprises:
   obtaining a phase current of the motor and performing a Clark transformation and a Park transformation on the three phase current to obtain a D axis current and a Q axis current;
   obtaining an estimated D axis current and an estimated Q axis current according to the estimated electromagnetic torque;
   obtaining a D axis voltage and a Q axis voltage via performing a PI control on a difference between the estimated D axis current and the D axis current, a difference between the estimated Q axis current and the Q axis current; and
   generating the PWM signal according to the D axis voltage, the Q axis voltage.

17. The oil pressure control method of claim 15, wherein obtaining the estimated mechanical torque comprises:
   obtaining an actual electromagnetic torque;
   performing a PI control or a PID control on a difference between the actual electromagnetic torque and the estimated electromagnetic torque to control a switch state of a plurality of switches of the drive circuit.

* * * * *